United States Patent
Cockrell et al.

(10) Patent No.: US 10,205,750 B2
(45) Date of Patent: Feb. 12, 2019

(54) POLICY-BASED SECURE WEB BOOT

(71) Applicant: Intel Corporation, Santa Clara, CA (US)

(72) Inventors: Brian Cockrell, Portland, OR (US); Jacob J. Gauthier, Hillsboro, OR (US); Jiewen Yao, Shanghai (CN); Vincent J. Zimmer, Federal Way, WA (US); Elmer A. Amaya, Lakewood, WA (US)

(73) Assignee: Intel Corporation, Santa Clara, CA (US)

( * ) Notice: Subject to any disclaimer, the term of this patent is extended or adjusted under 35 U.S.C. 154(b) by 349 days.

(21) Appl. No.: 13/799,294

(22) Filed: Mar. 13, 2013

(65) Prior Publication Data

US 2014/0282815 A1    Sep. 18, 2014

(51) Int. Cl.
*H04L 29/06*    (2006.01)
*G06F 21/57*    (2013.01)
(Continued)

(52) U.S. Cl.
CPC ............ *H04L 63/20* (2013.01); *G06F 9/4408* (2013.01); *G06F 9/4416* (2013.01);
(Continued)

(58) Field of Classification Search
CPC ...... H04L 63/20; H04L 63/08; H04L 63/0823
See application file for complete search history.

(56) References Cited

U.S. PATENT DOCUMENTS 6,266,809 B1 *  7/2001  Craig .................. G06F 8/65
                                                717/173
6,560,706 B1 *  5/2003  Carbajal ............ G06F 9/4416
                                                713/155
(Continued)

FOREIGN PATENT DOCUMENTS

CN    1823513 A    8/2006
CN    101197834 A  6/2008
(Continued)

OTHER PUBLICATIONS

Unified Extensible Firmware Interface Specification, Version 2.0, Jan. 31, 2006.*

(Continued)

*Primary Examiner* — Yin Chen Shaw
*Assistant Examiner* — Carlos E Amorin
(74) *Attorney, Agent, or Firm* — Barnes & Thornburg LLP

(57) ABSTRACT

A system, device, and method for providing policy-based secure cloud booting include a mobile computing device and a web server. The mobile computing device determines a remote boot address specifying the location of a boot resource on the web server. The mobile computing device opens a secure connection to the web server and maps the boot resource to a local firmware protocol. The mobile computing device executes the boot resource as a firmware image using the local firmware protocol. The boot resource may be a compact disc or DVD image mapped through a block I/O protocol. The boot resource may be a remote file system mapped through a file system protocol. The remote boot address may be configured using a manageability engine capable of out-of-band communication. The remote boot address may be determined based on the context of the (Continued)

mobile computing device, including location. Other embodiments are described and claimed.

17 Claims, 5 Drawing Sheets

(51) Int. Cl.
H04L 29/08 (2006.01)
G06F 9/4401 (2018.01)
(52) U.S. Cl.
CPC ............ G06F 21/575 (2013.01); H04L 67/02 (2013.01); H04L 67/125 (2013.01); H04L 63/0823 (2013.01)

(56) References Cited

U.S. PATENT DOCUMENTS

| | | | | |
|---|---|---|---|---|
| 6,842,695 | B1* | 1/2005 | Tu | G01S 5/0045 455/456.2 |
| 7,386,711 | B1* | 6/2008 | Haimovsky | G06F 9/4416 709/221 |
| 7,668,945 | B2* | 2/2010 | Doran | H04L 12/66 709/222 |
| 7,769,993 | B2* | 8/2010 | Carpenter | G06F 21/575 713/2 |
| 7,865,775 | B2* | 1/2011 | Yao | G06F 11/1417 713/1 |
| RE43,437 | E* | 5/2012 | Han et al. | 717/176 |
| 8,214,653 | B1* | 7/2012 | Marr | G06F 21/572 713/189 |
| 9,176,761 | B2* | 11/2015 | DeHaan | G06F 9/45533 |
| 2003/0023839 | A1* | 1/2003 | Burkhardt | G06F 8/63 713/1 |
| 2003/0046529 | A1* | 3/2003 | Loison | G06F 9/4416 713/2 |
| 2003/0131246 | A1 | 7/2003 | Reeves et al. | |
| 2005/0044363 | A1* | 2/2005 | Zimmer | G06F 21/572 713/170 |
| 2005/0071665 | A1* | 3/2005 | Zimmer | G06F 9/441 726/26 |
| 2005/0149729 | A1 | 7/2005 | Zimmer et al. | |
| 2006/0015931 | A1* | 1/2006 | Davis | G06F 21/575 726/6 |
| 2006/0026429 | A1* | 2/2006 | Kudo | G06F 21/575 713/173 |
| 2006/0047946 | A1* | 3/2006 | Keith, Jr. | G06F 9/4416 713/2 |
| 2006/0129797 | A1* | 6/2006 | Durfee | G06F 21/575 713/2 |
| 2006/0206699 | A1 | 9/2006 | Yokota et al. | |
| 2007/0022184 | A1* | 1/2007 | Sharma | G06F 9/4416 709/220 |
| 2007/0143605 | A1* | 6/2007 | Metke | H04W 12/06 713/168 |
| 2008/0046548 | A1 | 2/2008 | Doran et al. | |
| 2008/0082680 | A1* | 4/2008 | Grewal | G06F 9/4416 709/232 |
| 2008/0155159 | A1* | 6/2008 | Rivas | G06F 1/1616 710/305 |
| 2009/0113029 | A1* | 4/2009 | Abels | H04L 63/20 709/222 |
| 2009/0172381 | A1* | 7/2009 | Zimmer | G06F 9/4401 713/2 |
| 2009/0204964 | A1* | 8/2009 | Foley | G06F 21/53 718/1 |
| 2009/0327741 | A1* | 12/2009 | Zimmer | G06F 21/575 713/183 |
| 2010/0043072 | A1* | 2/2010 | Rothwell | G06F 21/566 726/24 |
| 2010/0077066 | A1* | 3/2010 | Chawla | G06F 9/4416 709/222 |
| 2010/0153697 | A1 | 6/2010 | Ford et al. | |
| 2010/0180265 | A1* | 7/2010 | Tsai | G06F 8/41 717/140 |
| 2011/0138166 | A1* | 6/2011 | Peszek | G06F 21/575 713/2 |
| 2012/0066509 | A1* | 3/2012 | Lapp | G06F 21/606 713/189 |
| 2012/0102576 | A1* | 4/2012 | Chew | G06F 12/1441 726/30 |
| 2012/0110312 | A1* | 5/2012 | Domsch | G06F 9/4416 713/2 |
| 2012/0180076 | A1* | 7/2012 | Shutt | G06F 9/4411 719/327 |
| 2012/0233601 | A1* | 9/2012 | Gounares | G06F 8/443 717/143 |
| 2013/0067209 | A1* | 3/2013 | Hall | G06F 9/441 713/2 |
| 2013/0174220 | A1* | 7/2013 | Berg | H04W 12/10 726/3 |
| 2013/0185548 | A1* | 7/2013 | Djabarov | H04L 41/082 713/2 |
| 2013/0254521 | A1* | 9/2013 | Bealkowski | G06F 9/445 713/2 |
| 2013/0290694 | A1* | 10/2013 | Civilini | H04L 41/0806 713/2 |
| 2014/0157351 | A1* | 6/2014 | Canning | H04L 63/20 726/1 |
| 2014/0258700 | A1* | 9/2014 | England | G06F 21/572 713/2 |

FOREIGN PATENT DOCUMENTS

| | | |
|---|---|---|
| GB | 2442348 A | 4/2008 |
| JP | 2006252168 A | 9/2006 |
| JP | 2009176213 A | 8/2009 |
| KR | 10-1022514 B1 * | 3/2011 |
| KR | 101022514 B1 | 3/2011 |

OTHER PUBLICATIONS

"iPXE," Wikipedia, The Free Encyclopedia, retrieved from: <http://en.wikipedia.org/w/index.php?title=IPXE&oldid=479826704>, edited Mar. 2, 2012, 2 pages.
"gPXE," Wikipedia, The Free Encyclopedia, retrieved from: <http://en.wikipedia.org/w/index.php?title=GPXE&oldid=479215822>, edited Feb. 28, 2012, 2 pages.
Nyström et al., "UEFI Networking and Pre-OS Security," Intel® Technology Journal, vol. 15, Issue 1, 2011, pp. 80-101.
Huth et al., "DHCPv6 Options for Network Boot," RFC 5970, Sep. 2010, 12 pages.
Mungara, "SOL/IDER explained," Intel® Developer Zone, retrieved from: <http://software.intel.com/en-us/blogs/2007/01/08/sol-ider-explained>, Jan. 8, 2007, 1 page.
International Search Report and Written Opinion received for International Application No. PCT/US2014/018670, dated Jun. 3, 2014, 14 pages.
European Search Report for Patent Application No. 14775411.3-1853/2973147, dated Sep. 22, 2016, 6 pages.
Chinese Office Action for Patent Application No. 201480008747.X, dated Aug. 2, 2017, 18 pages.
Second Office Action dated May 4, 2018 for Chinese Patent Application No. 201480008747.X, 15 pages.

* cited by examiner

POLICY-BASED SECURE WEB BOOT

BACKGROUND

Computing devices often execute a boot process according to the Unified Extensible Firmware Interface ("UEFI") specification, published by the Unified EFI Forum. The UEFI specification specifies an interface between the firmware of the computing device and the operating system of the computing device. The UEFI specification specifies a standard model for firmware drivers and applications that execute in a pre-operating system environment. In addition to performing traditional boot and initialization tasks, such drivers and applications may perform other tasks, such as diagnostic, maintenance, or management tasks.

Computing devices may boot from a network interface according to the Preboot Execution Environment ("PXE") specification. Network booting with PXE generally requires the end user to have knowledge of the provisioning environment, for example, knowledge of the boot server address. Network booting with PXE may require a specialized boot server to provide remote boot images.

Network booting may be accomplished over various networks, including the Internet. Much of the data communicated over the Internet is communicated on the so-called World Wide Web, a system of interconnected web servers on the Internet that provide content to remote clients using the hypertext transfer protocol ("HTTP"). A web server provides content as a collection of resources, each resource being accessible by a unique address called a uniform resource locator ("URL"). Resources of the web server may correspond to individual files stored on or accessible to the web server, or to groups of such files (e.g. directories or folders). Resources representing groups of files may include index files that contain links to the other resources of the group. A client issues a request to a web server for a particular resource, and in turn the web server issues a response to the client. HTTP responses include status messages and may include the requested content itself. HTTP is thus "stateless," meaning that the protocol does not require a persistent network connection between client and server. HTTP is plaintext; that is, requests, responses, and content are transferred over the network without encryption.

Authenticated or encrypted HTTP communication may be provided by layering HTTP communications on top of a secure transport-level protocol. For example, the HTTP Secure ("HTTPS") protocol layers HTTP on top of a transport layer security ("TLS") or secure sockets layer ("SSL") connection. TLS/SSL specifies a standard handshake procedure used to initiate a secure connection between a client and a server. In addition to connection encryption, the TLS/SSL connection provides authentication of the server and, optionally, the client. Standard HTTP requests and responses are then communicated using the secure TLS/SSL connection. Note that the term "secure HTTP" as used herein refers to HTTPS, and not the similar but largely unused S-HTTP.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
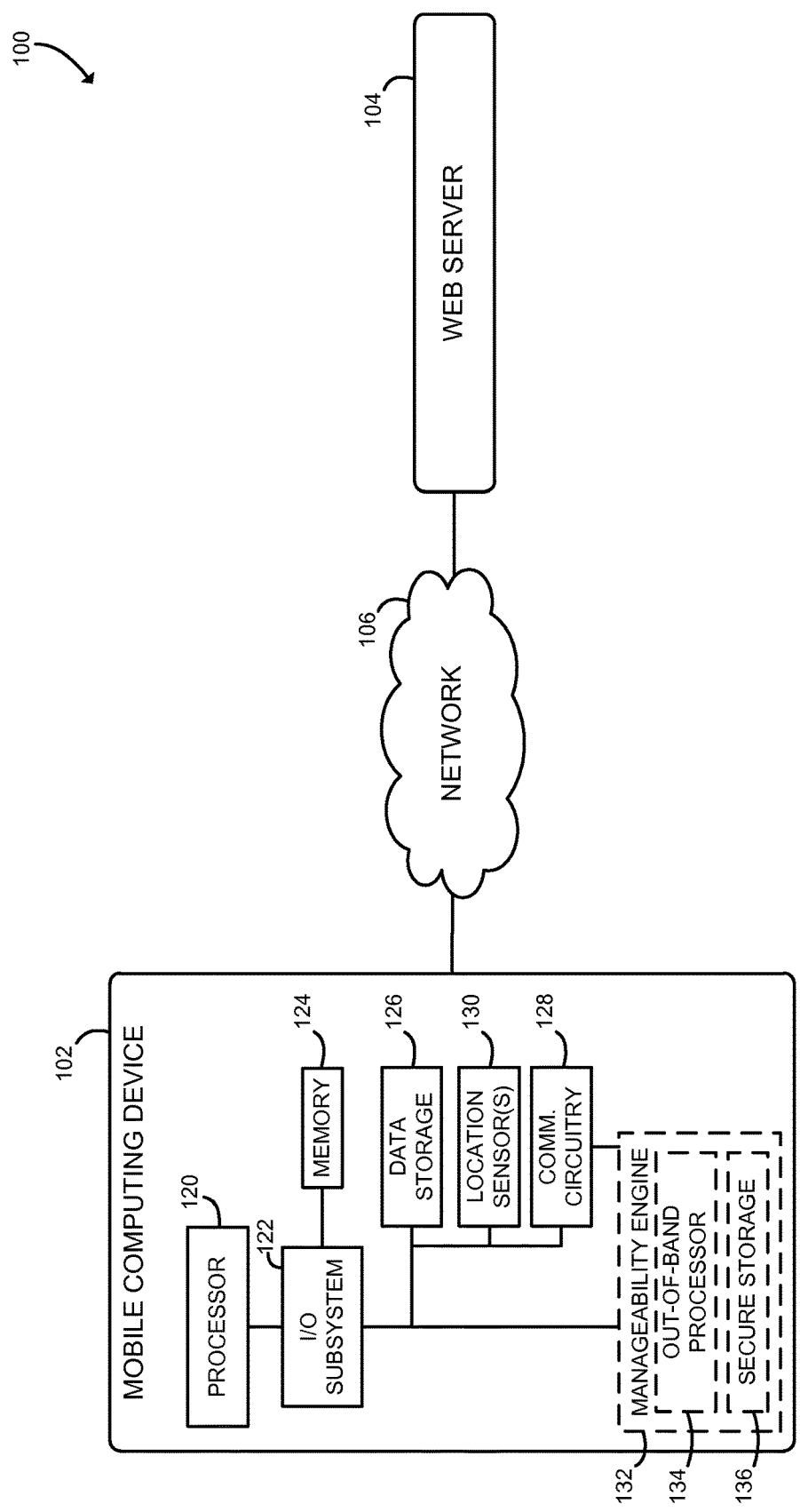
FIG. 1 is a simplified block diagram of at least one embodiment of a system for policy-based secure web boot.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for policy-based secure web boot includes a mobile computing device 102 and a web server 104 in communication with each other over a network 106. In use, as discussed in more detail below, the mobile computing device 102 is configured to open a secure HTTP connection to the web server 104, download one or more remote resources, and execute the remote resources in a preboot firmware environment.

The disclosed technologies allow for policy-based network boot using standard HTTP data transfer. Secure HTTP allows for authentication of client and server, as well as ensuring the integrity and privacy of boot files transferred over the network 106. By using secure HTTP, network boot may be accomplished over a public network such as the Internet. Additionally, networks are commonly configured to accommodate secure HTTP traffic and to allow secure HTTP communication through network firewalls. Thus, enabling policy-based web booting may not require modifying any underlying network configuration or topology. Further, web servers are in common use. Because of such common use, the configuration and maintenance of web servers is well-known. In fact, many organizations have in-house technical staff capable of publishing resources on a web server.

The mobile computing device 102 may be embodied as any type of device for performing the functions described herein. For example, the mobile computing device 102 may be embodied as, without limitation, a smart phone, a tablet computer, a laptop computer, a notebook computer, a mobile computing device, a cellular telephone, a handset, a messaging device, a vehicle telematics device, a distributed computing system, a multiprocessor system, a consumer electronic device, and/or any other computing device configured to perform policy-based secure web boot. As shown in FIG. 1, the illustrative mobile computing device 102 includes a processor 120, an input/output subsystem 122, a memory 124, a data storage device 126, a communication circuit 128, a location sensor(s) 130, and a manageability engine 132. Of course, the mobile computing device 102 may include other or additional components, such as those commonly found in a mobile computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the mobile computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the mobile computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the mobile computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may include a system partition that stores data and firmware code for the mobile computing device 102. The data storage device 126 may also include an operating system partition that stores data files and executables for an operating system of the mobile computing device 102.

The communication circuit 128 of the mobile computing device 102 may be embodied as any communication circuit, device, or collection thereof, capable of enabling communications between the mobile computing device 102, the web server 104, and/or other remote devices. The communication circuit 128 may be configured to use any one or more communication technology (e.g., wireless or wired communications) and associated protocols (e.g., Ethernet, Bluetooth®, Wi-Fi®, WiMAX, etc.) to effect such communication. The communication circuit 128 may be embodied as a network adapter, including a wireless network adapter.

In the illustrative embodiment, the mobile computing device 102 includes one or more location sensor(s) 130. The location sensor(s) 130 may be embodied as any type of sensor capable of determining the precise or approximate position of the mobile computing device 102. For example, the location sensor(s) 130 may be embodied as a global positioning system ("GPS") receiver, capable of determining the precise coordinates of the mobile computing device 102. In other embodiments, the location sensor(s) 130 may triangulate the position of the mobile computing device 102 using distances or angles to cellular network towers with known positions, provided by the communication circuit 128. In other embodiments, the location sensor(s) 130 may determine the approximate position of the mobile computing device 102 based on association to wireless networks with known positions, using the communication circuit 128.

The manageability engine 132 is embodied as a device that provides remote configuration, control, or management of the mobile computing device 102. The illustrative manageability engine 132 includes an out-of-band processor 134. The out-of-band processor 134 is separate and distinct from the main processor 120 of the mobile computing device 102. As such, the manageability engine 132 is capable of operating independently of the state of the rest of the mobile computing device 102. That is, the manageability engine 132 is capable of operating regardless of the operating state of the processor 120, including when the mobile computing device 102 is powered off, when the mobile computing device 102 is executing a preboot firmware environment, when an operating system of the mobile computing device 102 is active, and when the operating system is crashed or otherwise inactive. The manageability engine 132 is also capable of communicating using the communication circuit 128 independently of the state of the mobile computing device 102, also known as "out-of-band" communication. In some embodiments, the manageability engine 132 may include a dedicated network adaptor for such out-of-band communication, in addition to, or instead of, connecting via the communications circuit 128. The manageability engine 132 may also include secure storage 136, which is a secure memory space of the manageability engine 132 that is not accessible by other components of the mobile computing device 102, and may optionally be a secure portion of system flash memory. In some embodiments, the manageability engine 132 may be incorporated into the I/O subsystem 122.

The web server 104 is configured to receive and respond to HTTP requests from the mobile computing device 102. The web server 104 may be embodied as any type of data server or similar computing device capable of performing the functions described herein. In particular, the web server 104 may be embodied as a server computer running a web server process such as Microsoft® Internet Information Services ("IIS") or the Apache HTTP Server. The web server 104 may be embodied as a standard production web server, with no modifications required particular to the system 100. As such, the web server 104 may include components and features similar to the mobile computing device 102, such as a processor, I/O subsystem, memory, data storage, communication circuitry, and various peripheral devices, which are not illustrated in FIG. 1 for clarity of the present description.

Further, the web server 104 may be embodied as a single server computing device or a collection of servers and associated devices. For example, in some embodiments, the web server 104 is embodied as a cloud service to perform the functions described herein. In such embodiments, the web server 104 may be embodied as a "virtual server" formed from multiple computing devices distributed across the network 106 and operating in a public or private cloud. Accordingly, although the web server 104 is illustrated in FIG. 1 and described below as embodied as single server computing device, it should be appreciated that the web server 104 may be embodied as multiple devices cooperating together to facilitate the functionality described below.

Figure 2:
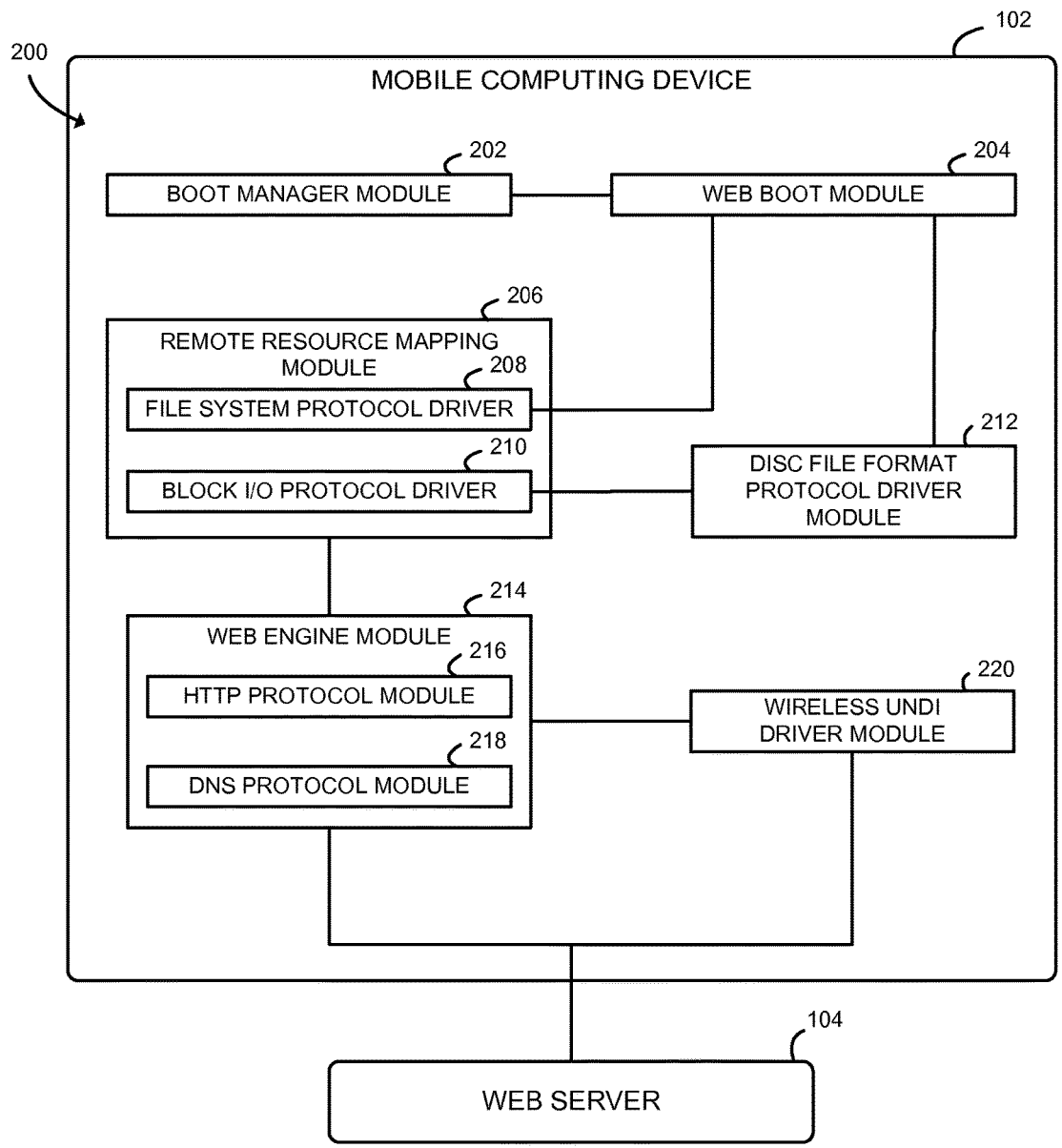
FIG. 2 is a simplified block diagram of at least one embodiment of a firmware environment of a mobile computing device of the system of FIG. 1.

Referring now to FIG. 2, in one embodiment, the mobile computing device 102 establishes a firmware environment 200 during operation. The illustrative firmware environment 200 includes a boot manager 202, a web boot module 204, a remote resource mapping module 206, a disc file format protocol driver module 212, a web engine module 214, and a wireless UNDI driver module 220. The various modules of the firmware environment 200 may be embodied as hardware, firmware, software, or a combination thereof. Additionally, in some embodiments, some or all of the modules of the firmware environment 200 may be integrated with, or form part of, other modules or software/firmware structures.

The web engine module 214 is configured to implement HTTPS and communicate with the web server 104. The web engine module 214 establishes an HTTPS connection to the web server 104, requests remote resources from the web server 104, and downloads the remote resources over the network 106 to the mobile computing device 102. The remote resources are identified by a standard uniform resource locator ("URL"), which may include a domain name and a path identifying the remote resources. The web engine module 214 may use the domain name system ("DNS") to convert domain names into internet protocol numbers. The web engine module 214 may communicate using IPv4, IPv6, or other communication protocol. In some embodiments, those functions may be performed by sub-modules, for example by an HTTP protocol module 216 and/or a DNS protocol module 218.

The wireless universal network driver interface ("UNDI") driver module 220 is configured to provide network communications using a wireless network adapter of the mobile computing device 102. UNDI is an architectural interface to network interface cards specified by the UEFI specification. The wireless UNDI driver module 220 implements UNDI for a wireless network adaptor of the mobile computing device 102, allowing other modules of the firmware environment 200 to communicate using the wireless network adapter. For example, the web engine module 214 may open a secure connection and communicate wirelessly with the web server 104 using the wireless UNDI driver module 220. The wireless UNDI driver module 220 may be implemented as a UEFI driver. Of course, in other embodiments, driver module 220 may be embodied as a module to implement a UEFI driver developed for a specific network adapter (i.e., a non-universal driver) such as, for example, an Intel® Pro 1000 network adapter.

The remote resource mapping module 206 is configured to map remote resources stored on the web server 104 to one or more local protocols. The remote resource mapping module 206 installs a protocol interface for each of the one or more local protocols into the firmware environment of the mobile computing device 102, and then accesses the remote resources of the web server 104 in response to the one or more local protocols being invoked by other firmware modules of the mobile computing device 102. In other words, the remote resource mapping module 206 may be an abstraction layer between the web engine module 214 and other modules of the firmware environment 200. In some embodiments, the remote resource mapping module 206 may map remote resources to a local file system. Such a local file system abstracts the remote resources as a set of local files and directories. In some embodiments, the remote resource mapping module 206 may map remote resources to a local block-level device. Such a block-level device abstracts the remote resources as a data storage device including a number of data blocks. In some embodiments, those functions may be performed by sub-modules, for example by a file system protocol driver 208 and/or a block I/O protocol driver 210.

The disc file format protocol driver module 212 is configured to interface with a block-level storage device formatted according to an optical disc format. In some embodiments, the optical disc format may be embodied as the bootable compact disc file system ("CDFS") format specified by the "El Torito" extension of the ISO 9660 standard. Such CDFS is also known as the "ISO 9660" file system and therefore files containing CDFS images are commonly referred to as ".iso" files. In some embodiments, the optical disc format may be the universal disk format ("UDF") used by DVDs. The disc file format protocol driver module 212 provides access to the file system stored on a CDFS- or UDF-formatted storage device. The disc file format protocol driver module 212 may interface with and invoke the block I/O protocol driver 210 to provide access to files and directories stored in remote resources of the web server 104.

The web boot module 204 is configured to determine a remote boot address containing a boot image, open a secure connection to the web server 104 to download the boot image, and execute the boot image as a firmware application. The web boot module 204 may be embodied as a UEFI boot option. The remote boot address is a standard uniform resource locator ("URL") specifying the use of HTTPS and the location of the remote boot image. The web boot module 204 generally may determine the remote boot address based on the configuration of the mobile computing device 102, the context of the mobile computing device 102, or input from a user of the mobile computing device 102. The web boot module 204 supplies the remote boot address to the remote resource mapping module 206. The web boot module 204 accesses the downloaded boot resource through the local protocol or local protocols provided by the remote resource mapping module 206. The remote resource mapping module 206 in turn accesses the web server 104 using the web engine module 214. The web boot module 204 may call an operating system loader of the mobile computing device 102, which ends boot services provided by firmware.

The boot manager module 202 is configured to enumerate firmware drivers, applications, and other modules of the mobile computing device 102, determine an ordering of such firmware modules, and load the firmware modules. The boot manager module 202 may select a boot option from several boot options available on the mobile computing device 102. The boot manager module 202 may select, load, and start the web boot module 204.

Figure 3:
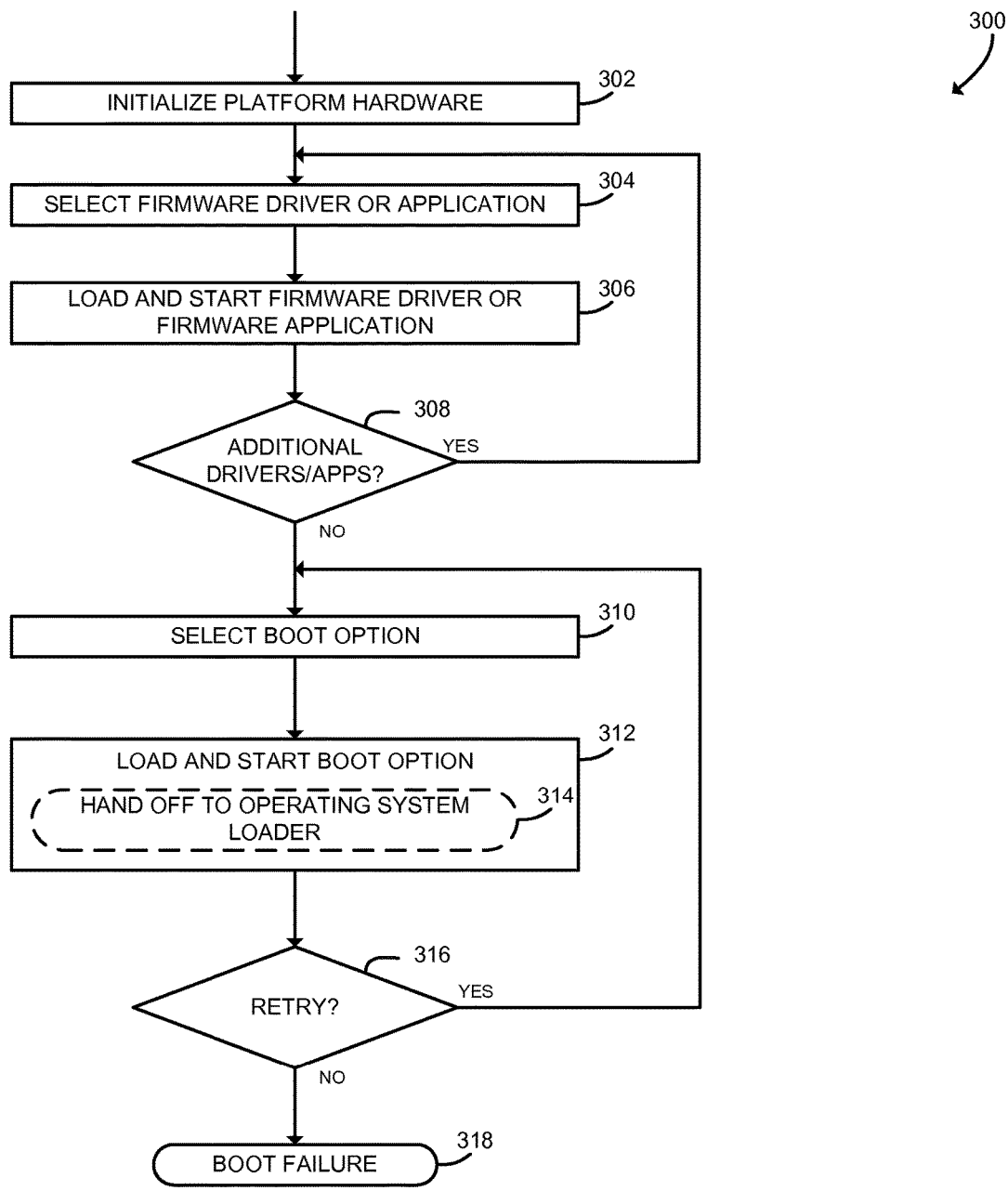
FIG. 3 is a simplified flow diagram of at least one embodiment of a boot process according to the UEFI specification that may be executed by the mobile computing device of FIGS. 1 and 2.

Referring now to FIG. 3, in use, the mobile computing device 102 may execute a boot process 300 according to the UEFI specification. In block 302, the mobile computing device 102 initializes platform hardware. For example, the mobile computing device 102 may initialize particular components required to process boot firmware, for example the memory 124 and the I/O subsystem 122.

In block 304, the mobile computing device 102 selects a firmware driver or a firmware application. At this stage, the boot process 300 is under control of the boot manager 202. Firmware drivers and applications are binary images stored in the system partition of the data storage device 126. The particular drivers and applications to be loaded are platform-dependent and may be enumerated in global variables of the mobile computing device 102, for example, in non-volatile flash memory storage of the mobile computing device 102. The boot manager 202 may enumerate the firmware drivers and applications to be loaded and determine a required boot order. The boot order may be based on dependencies between the firmware drivers and applications.

In block 306, the mobile computing device 102 loads and starts a firmware driver or firmware application. Firmware drivers and applications are essentially the same, except that applications are generally unloaded from the memory 124 after returning from their entry point, and drivers generally stay resident in the memory 124 unless they return with an error code. Firmware drivers and applications may initialize or control hardware of the mobile computing device 102. Firmware drivers or applications may also install firmware protocol interfaces, which define function call interfaces and, after being installed, allow other firmware images to invoke provided services.

In block 308, the mobile computing device 102 determines whether additional firmware drivers or applications remain to be loaded. If additional firmware drivers or applications remain to be loaded, the boot process 300 loops back to block 304. If not, the boot process advances to block 310.

In block 310, the mobile computing device 102 determines a boot option. A boot option is a firmware application that will be loaded and started by the boot manager 202. Boot options are typically operating system loaders, although the boot option may include diagnostic, maintenance, or management applications. The particular boot option selected may be specified in global variables of the mobile computing device 102. The global variables of the mobile computing device 102 may specify several boot options, including a relative ordering of the boot options. In some embodiments, the boot option may be selected by a user of the mobile computing device 102 through a menu or other means presented on the mobile computing device 102. In some embodiments, the mobile computing device 102 may include a default boot option or default rules for selecting a boot option.

Figure 4:
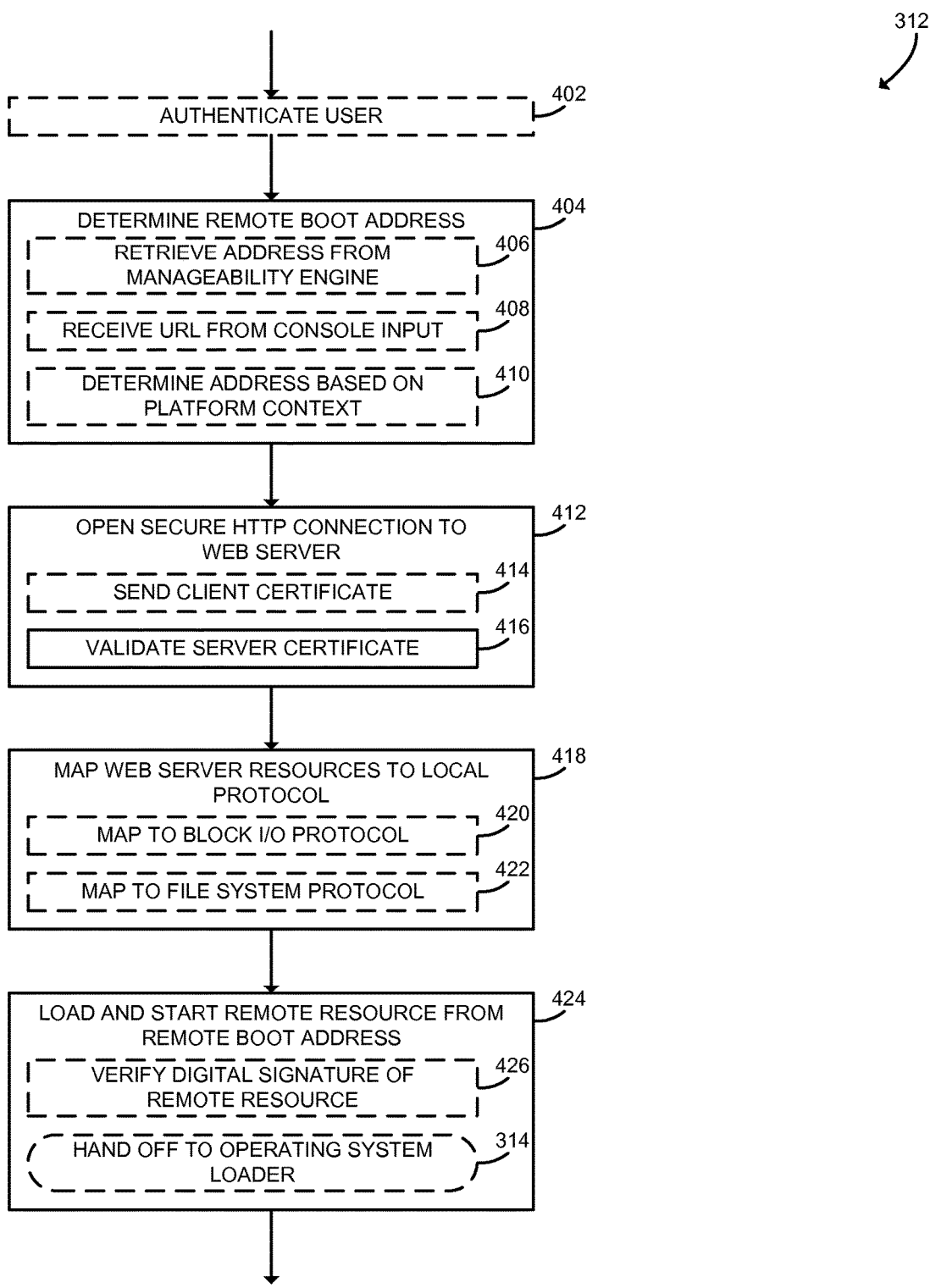
FIG. 4 is a simplified flow diagram of at least one embodiment of a boot option for policy-based secure web boot that may be executed by the mobile computing device of FIGS. 1 and 2.

In block 312, the mobile computing device 102 loads and starts the selected boot option (see FIG. 4). After being started, the selected boot option may initialize and load an operating system of the mobile computing device 102. In block 314, the mobile computing device 102 hands off control to an operating system loader. Such operating system loader may not be stored in the system partition of the data storage device 126. As part of the handoff, the boot option terminates boot services, for example by calling the function ExitBootServices( ). Therefore, if such a boot option is successful, the boot process 300 is complete, the operating system is in control of the mobile computing device 102, and the boot process 300 does not proceed to block 316.

If boot services are not terminated in block 314, the boot process 300 proceeds to block 316. In block 316, the mobile computing device 102 determines whether to attempt to load another boot option. As discussed above, the global variables of the mobile computing device 102 may specify several boot options. If additional boot options remain, the mobile computing device 102 may attempt to load another boot option. In some embodiments, the mobile computing device 102 may examine any error codes returned by the boot option in block 310 to determine whether to attempt to load another boot option. If the mobile computing device 102 determines to attempt to load another boot option, the boot process 300 loops back to block 310 to select the boot option. If the mobile computing device 102 determines not to load another boot option, the boot process 300 advances to block 318.

In block 318, the mobile computing device 102 experiences boot failure. The particular actions taken on boot failure are platform-dependent. In some embodiments, the mobile computing device 102 may provide an error message to the user. In some embodiments, the mobile computing device 102 may invoke platform-dependent diagnostic or maintenance applications. In some embodiments, the mobile computing device 102 may simply shut off.

Referring now to FIG. 4, the mobile computing device 102 may execute a boot option 312 for policy-based secure web boot. Such boot option 312 may be executed as part of the boot process 300 specified by the UEFI specification (i.e., as part of the process of block 312 of the boot process 300). The selected boot option 312 may be embodied by, or otherwise executed by, the web boot module 204. In block 402, in some embodiments the mobile computing device 102 authenticates a user of the mobile computing device 102. The mobile computing device 102 may receive login information from the user, which may be embodied as user credentials such as a username and password or a user certificate. In some embodiments, login information may be provided by a security token, such as a smart card or biometric reader. The mobile computing device 102 may authenticate the user by comparing the received login information to login information stored on the mobile computing device 102. In other embodiments, the mobile computing device 102 may consult a separate authentication server (not illustrated).

In block 404, the mobile computing device 102 determines the remote boot address. The remote boot address is illustratively embodied as a uniform resource locator ("URL") that identifies the web server 104 and specifies a particular remote resource containing a remote boot image. Selection of the remote boot address thus may allow selection of a particular boot policy. The remote boot address may specify the use of secure HTTP (using URL scheme name "https"). In some embodiments, the remote boot address is stored in the data storage 126 or in non-volatile flash memory storage of the mobile computing device 102. Such embodiments enable several use cases: the remote boot address may be specified by the user and stored for later use, software of the mobile computing device 102 may configure a remote boot address for use upon reboot, and/or the manufacturer of the computing device 102 may pre-program a selection of one or more remote boot addresses. Further, in such embodiments, the manageability engine 132 may not be included or otherwise required in the computing device 102. In some embodiments, the mobile computing device 102 receives the remote boot address from a dynamic host configuration protocol ("DHCP") server. For example, the RFC 5970 proposed standard specifies DHCPv6 options to configure a computing device for network booting. In some embodiments, in block 406 the mobile computing device 102 receives the remote boot address from the manageability engine 132. In such embodiments the remote boot address may be supplied to the manageability engine 132 using its out-of-band network communications capability. For example, the remote boot address may be supplied by enterprise information technology staff, allowing configuration of the remote boot address without intervention by the user of the mobile computing device 102. In some embodiments, the remote boot address may be stored in the secure memory space of the manageability engine 132. Additionally, in some embodiments, in block 408 the mobile computing device 102 receives the remote boot address from console input of the mobile computing device 102. The console of the mobile computing device 102 may be embodied as a display and keyboard, a touch screen, or any other user interface peripheral device of the mobile computing device 102. Thus, the user of the mobile computing device 102 may provide the remote boot address manually.

In some embodiments, in block 410 the mobile computing device 102 may determine the remote boot address based on the context of the mobile computing device 102, for example, based on location, mode, current user, current network, or the like. The mobile computing device 102 may use sensors to determine if the context is appropriate for the remote boot address; these sensors may include location (e.g., geo-fencing) as sensed by GPS in the mobile computing device 102, identity as sensed by a password entered by a user or a biometric input (e.g., voice, fingerprint, iris scan, USB dongle, near-field communication), or other criteria (e.g., date and time). For example, in some embodiments, the context of the mobile computing device 102 may include the location of the mobile computing device 102, as determined using the location sensor(s) 130. As such, the mobile computing device 102 may determine a different remote boot addresses when the mobile computing device 102 is located at the user's work and at the user's home. In some embodiments (not illustrated), the remote boot address may be the same, and boot policies—that is, selection of boot images—may be performed by the web server 104. For example, the mobile computing device 102 may include context information in the request to the web server 104 as part of an HTTP POST request. The web server 104 may include logic to return a particular boot image based on the information received from the mobile computing device 102. Such logic may be implemented as an ordinary web application of the web server 104.

In block 412, the mobile computing device 102 opens an HTTPS connection to the web server 104. The HTTPS connection uses the communication circuit 128 to communicate with the web server 104, and therefore may be embodied as a wired or a wireless network connection. As discussed above, an HTTPS connection is conventional HTTP communicated over a connection encrypted using the SSL/TLS protocol. The HTTPS connection supports authentication and privacy. In some embodiments, in block 414 the mobile computing device 102 may send a client certificate to the web server 104 as part of a secure handshake protocol, for example, while establishing a TLS/SSL connection. The client certificate may be bound to the mobile computing device 102 or may be associated with a particular user of the mobile computing device 102. Sending the client certificate allows the web server 104 to verify that the mobile computing device 102 and/or the user of the mobile computing device 102 is a known entity. The secure connection may not be opened if the web server 104 does not verify the client certificate. The client certificate may be installed in, managed by, or otherwise supplied by the manageability engine 132. In some embodiments, the client certificate may be determined in response to successfully authenticating the user in block 402, described above. Thus, an unauthorized user may be prohibited from accessing the web server 104. Note that web servers supporting HTTPS connections over the public Internet typically do not validate a client certificate; in such connections, the web server expects connections from numerous anonymous clients, so only the identity of the web server is important. Therefore, authenticating the client certificate may be more appropriate for embodiments of the mobile computing device 102 and the web server 104 under common control or management.

In block 416, the mobile computing device 102 validates a server certificate received from the web server 104. As discussed above, by validating the server certificate, the mobile computing device 102 confirms the identity of the web server 104. The mobile computing device 102 may validate the server certificate as part of a standard secure handshake protocol, for example, while establishing a TLS/SSL connection. After opening the secure connection, the boot option 312 proceeds to block 418.

In block 418, the mobile computing device 102 maps a resource of the web server 104 to a local protocol of the mobile computing device 102. The resource is specified by the remote boot address determined in block 404. The requested resource may be any file or directory used for booting the mobile computing device 102, and is thus sometimes called a boot resource. The mobile computing device 102 sends HTTP requests to the web server 104 for the requested resource, and the web server 104 sends HTTP responses including the requested resource to the mobile computing device 102. In some embodiments, the mobile computing device 102 may request and download the entire resource immediately, caching the resource locally on the mobile computing device 102. In some embodiments, the mobile computing device 102 may request and download the resource or parts of the resource as requested by firmware drivers or applications of the mobile computing device 102.

In block 420, in some embodiments, the mobile computing device 102 maps the remote resource to a local block input/output protocol. A block I/O protocol represents a mass storage device as an array of small, uniformly sized data blocks, without higher-level abstractions like files and directories. Higher-level protocols of the firmware environment 200 may consume the block I/O protocol to provide access to file systems, including files and directories. For example, the remote resource may be embodied as a single binary file formatted as an ISO 9660 compatible disk image (an .iso file). The block I/O protocol provides access to data of the remote disk image as an array of blocks. A standard compact disc file system ("CDFS") driver included in the firmware of the mobile computing device 102 consumes the block-level protocol, allowing access to files and directories stored in the remote resource. In other embodiments, the remote resource may be a UDF-formatted disk image, an El Torito bootable compact disc image, or another disk image readable by a firmware driver of the mobile computing device 102. As discussed above, the block I/O protocol may download and cache the entire remote disk image, for example using an HTTP GET request, and may provide access to requested blocks from the cached disk image. In other embodiments, the block I/O protocol may download requested blocks from the remote resource using an HTTP RANGE header field to download a portion of the remote resource less than its entirety.

Figure 5:
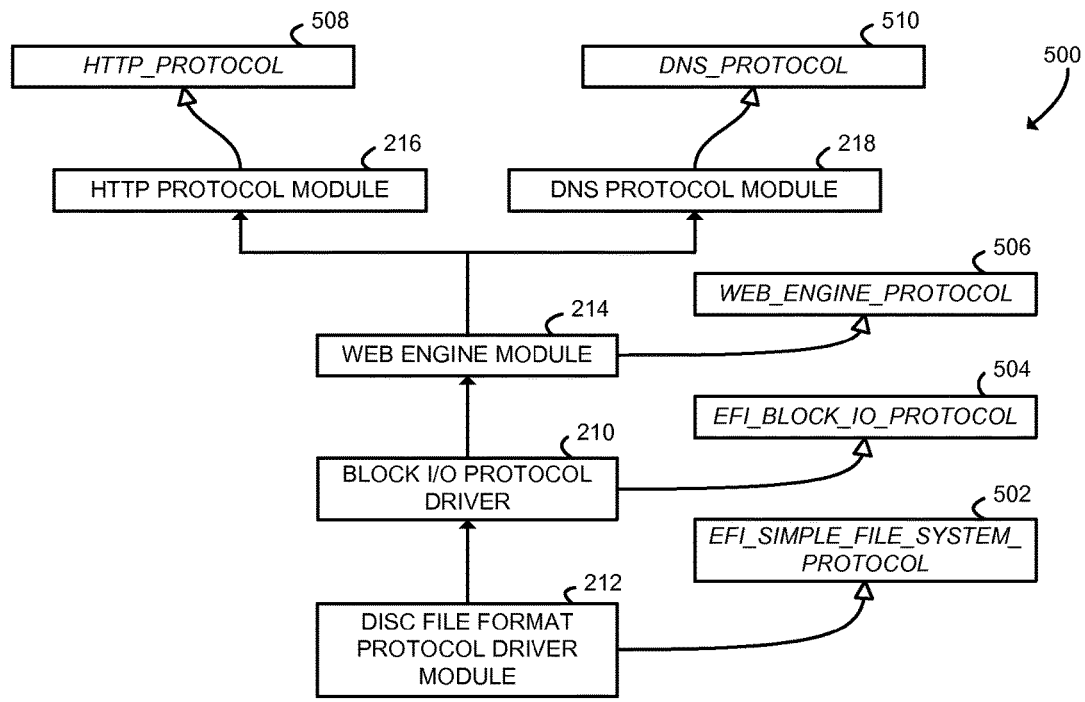
FIG. 5 is a simplified block diagram of one embodiment of a driver stack of the firmware environment of FIG. 2.

For example, referring now to FIG. 5, a block diagram 500 illustrates a driver stack that may be installed to map the remote resource to a local block input/output protocol. The disc file format protocol driver module 212 installs an EFI_SIMPLE_FILE_SYSTEM_PROTOCOL 502 described in the UEFI specification. The disc file format protocol driver module 212 depends on the block I/O protocol driver 210. The block I/O protocol driver 210 installs an EFI_BLOCK_IO_PROTOCOL 504 described in the UEFI specification. The block I/O protocol driver 210 depends on the web engine module 214. The web engine module 214 installs a WEB_ENGINE_PROTOCOL 506 and depends on both the HTTP protocol module 216 and the DNS protocol module 218. The HTTP protocol module 216 installs an HTTP_PROTOCOL 508 and the DNS protocol module 218 installs a DNS_PROTOCOL 510. Thus, a firmware application or driver may access files by calling functions defined by the EFI_SIMPLE_FILE_SYSTEM_PROTOCOL 502 that are handled by the disc file format protocol driver module 212. Such function calls are passed through the driver stack, ultimately resulting in HTTP interactions with the web server 104.

Referring back to FIG. 4, in block 422, in some embodiments, the mobile computing device 102 maps the remote resource to a local file system protocol. A file system protocol provides access to directories and files stored on a storage device. For example, the remote boot address determined in block 404 may represent the root of a directory structure stored on the web server 104. Each file stored on the web server 104 corresponds to a file exposed through the file system protocol. As discussed above, the mobile computing device 102 may download each file as requested using an HTTP GET request. The directory structure of the web server 104 also provides a mechanism for the mobile computing device 102 to enumerate the files in each directory. For example, the web server 104 may return or generate an index file listing all files stored in the directory (e.g., "index.html").

Figure 6:
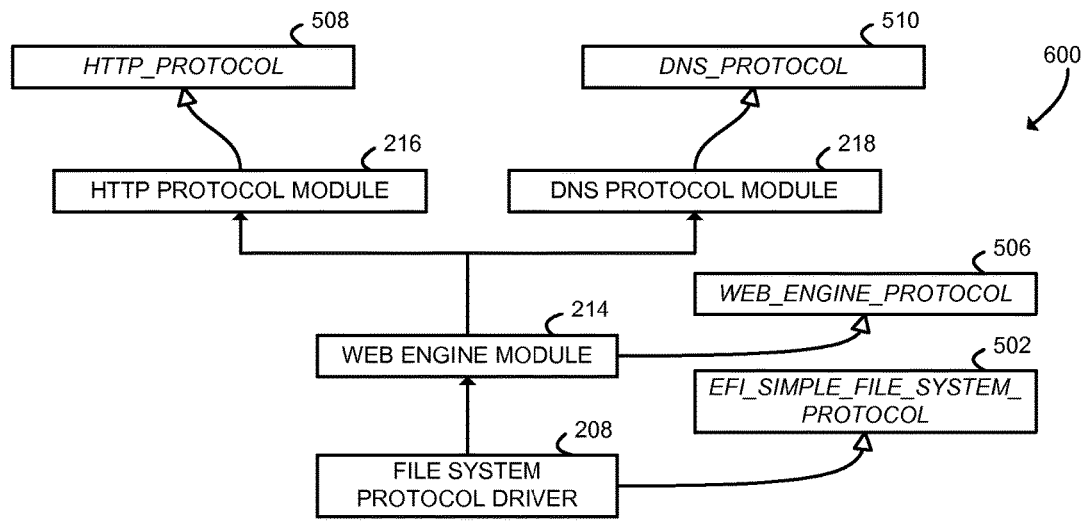
FIG. 6 is a simplified block diagram of another embodiment of a driver stack of the firmware environment of FIG. 2.

For example, referring now to FIG. 6, a block diagram 600 illustrates a driver stack that may be installed to map the remote resource to a local file system protocol. The file system protocol driver 208 installs the EFI_SIMPLE_FILE_SYSTEM_PROTOCOL 502 and depends on the web engine module 214. As described above in relation to FIG. 5, the web engine module 214 installs the WEB_ENGINE_PROTOCOL 506 and depends on both the HTTP protocol module 216 and the DNS protocol module 218. Also as described above in relation to FIG. 5, the HTTP protocol module 216 installs the HTTP_PROTOCOL 508 and the DNS protocol module 218 installs the DNS_PROTOCOL 510. As above, a firmware application or driver may access files through the EFI_SIMPLE_FILE_SYSTEM_PROTOCOL 502. In such example, function calls to the EFI_SIMPLE_FILE_SYSTEM_PROTOCOL 502 are handled by the file system protocol driver 208 and translated into HTTP interactions with the web server 104.

Referring back to FIG. 4, in block 424, the mobile computing device 102 executes a remote resource downloaded from the remote boot address as a firmware image. To execute the resource, the mobile computing device 102 loads the resource into memory using protocols for loading firmware images, and then starts executing code at an entry point of the in-memory image. Thus, the mobile computing device 102 loads and starts the image in the same manner as a locally-stored firmware image, because the remote resource has been mapped to a local protocol. For example, the mobile computing device 102 may access the remote resource using the EFI_SIMPLE_FILE_SYSTEM_PROTOCOL 502 as discussed above. The remote resource may be embodied as a firmware driver, firmware application, or firmware operating system loader. The loaded firmware image may access additional remote resources of the web server 104 using the secure web connection and the local resource mapping established in blocks 412 and 418, respectively. Such additional remote resources may be embodied as configuration files, data files, or additional firmware images that may be loaded and started.

In some embodiments, in block 426, the mobile computing device 102 may verify a digital signature of the remote resource. As described above, the secure HTTP connection established in block 412 validates the identity of the web server 104, may validate the identity of the mobile computing device 102, and protects the remote resource from tampering or eavesdropping while being transferred over the network 106. However, the secure HTTP connection does not provide any assurance concerning the integrity or authenticity of the contents of the remote resource itself. To allow for authenticating or verifying integrity, the remote resource may include a digital signature, which is a hash of the remote resource encrypted with a private key. The mobile computing device 102 may verify the digital signature by independently computing a hash of the remote resource, decrypting the digital signature with a known public key to produce a decrypted hash value, and then comparing the computed hash value to the decrypted hash value. If the hash values match, then the mobile computing device 102 has verified that the remote resource was signed using the private key and has not been modified since being signed. If the public key is trusted, for example by being issued by a known certificate authority, then the mobile computing device 102 has verified that the remote resource was signed by a known entity. In some embodiments, the mobile computing device 102 may verify the digital signature using the secure boot logic specified in the UEFI specification.

While the remote resource executes as a firmware image, the remote resource may hand off control to an operating system, as illustrated by block 314. For example, after successfully loading the operating system, the firmware image may call ExitBootServices( ), causing boot services firmware to be unloaded and terminated. If an operating system is not successfully started, the boot option 312 returns to its caller. In some embodiments, the boot option 312 may return a status code indicating any errors or other reasons that an operating system was not started.

Although illustrated as occurring sequentially during execution of the boot option 312, the functions described in FIG. 4 may be embodied in one or more firmware drivers or applications, and may be performed at different times. For example, receiving user login information as described in block 402, determining the remote boot address as described in block 404, and mapping the remote resources as described in block 418 may each be embodied as firmware drivers that are loaded and stay resident prior to loading the boot option 312.

Additionally, although the mobile computing device 102 has been illustrated in the FIGS. 1-6 and described above as a "mobile" computing device, it should be appreciated that the technologies described herein are equally applicable to stationary or, otherwise "non-mobile," computing devices. As such, in some embodiments, the computing device 102 may be embodied as, for example, a desktop computer, rack-based computer, or other non-mobile computing device.

Examples

Example 1 includes a mobile computing device to securely boot from a web server, the mobile computing device comprising a web boot module to determine a remote boot address that a location of a boot resource of the web server; a web engine module to open a secure connection from the mobile computing device to the web server; and a remote resource mapping module to map the boot resource of the web server to a local firmware protocol; wherein the web boot module is to execute the boot resource as a firmware image using the local firmware protocol.

Example 2 includes the subject matter of Example 1, and wherein the web engine module is further to download the boot resource of the web server from the web server to the mobile computing device in response to the boot resource being mapped to the local firmware protocol.

Example 3 includes the subject matter of any of Examples 1 and 2, and wherein the web engine module is further to download a portion, less than the entirety, of the boot resource of the web server from the web server to the mobile computing device in response to the boot resource being mapped to the local firmware protocol.

Example 4 includes the subject matter of any of Examples 1-3, and further including a wireless network adapter; and a wireless universal network driver interface ("UNDI") driver module to open the secure connection using the wireless network adapter.

Example 5 includes the subject matter of any of Examples 1-4, and wherein the web boot module comprises a web boot module to receive the remote boot address from a dynamic host configuration protocol server.

Example 6 includes the subject matter of any of Examples 1-5, and further including a manageability engine, wherein the web boot module comprises a web boot module to receive the remote boot address from the manageability engine.

Example 7 includes the subject matter of any of Examples 1-6, and wherein the remote boot address is stored in a secure memory space of the manageability engine.

Example 8 includes the subject matter of any of Examples 1-7, and wherein the web boot module comprises a web boot module to receive the remote boot address from a console of the mobile computing device.

Example 9 includes the subject matter of any of Examples 1-8, and wherein the web boot module comprises a web boot module to determine the remote boot address based on a context of the mobile computing device.

Example 10 includes the subject matter of any of Examples 1-9, further including a location sensor, wherein the web boot module comprises a web boot module to determine the remote boot address based on a location of the mobile computing device determined using the location sensor.

Example 11 includes the subject matter of any of Examples 1-10, and wherein the web engine module comprises a web engine module to (i) send a certificate of the mobile computing device to the web server and (ii) open the secure connection in response to the certificate being validated by the web server.

Example 12 includes the subject matter of any of Examples 1-11, and wherein the boot option module comprises a boot option module to authenticate a user of the mobile computing device on the mobile computing device; and the web engine module comprises a web engine module to send a certificate associated with the user to the web server in response to the user being authenticated.

Example 13 includes the subject matter of any of Examples 1-12, and wherein the remote resource mapping module comprises a block input/output protocol driver to map a file system image to a local block input/output firmware protocol.

Example 14 includes the subject matter of any of Examples 1-13, and further including a disc file format protocol driver module to map one of a compact disc file system image or a universal disk format file system image.

Example 15 includes the subject matter of any of Examples 1-14, and wherein the remote resource mapping module comprises a file system protocol driver to map the boot resource to a local file system protocol of the mobile computing device.

Example 16 includes the subject matter of any of Examples 1-15, and wherein the firmware image comprises an operating system loader, wherein the operating system loader terminates boot services of the mobile computing device.

Example 17 includes the subject matter of any of Examples 1-16, and wherein the web boot module comprises a web boot module to verify a digital signature of the boot resource; and execute the boot resource in response to successfully verifying the digital signature.

Example 18 includes a method for secure web boot on a mobile computing device, the method comprising determining, on the mobile computing device, a remote boot address that identifies a location of a boot resource of a web server; opening a secure connection from the mobile computing device to the web server; mapping, on the mobile computing device, the boot resource of the web server to a local firmware protocol; and executing, on the mobile computing device, the boot resource as a firmware image using the local firmware protocol.

Example 19 includes the subject matter of Example 18, and further including downloading the boot resource of the web server from the web server to the mobile computing device in response to mapping the boot resource to the local firmware protocol.

Example 20 includes the subject matter of any of Examples 18 and 19, and further including downloading a portion, less than the entirety, of the boot resource of the web server from the web server to the mobile computing device in response to mapping the boot resource to the local firmware protocol.

Example 21 includes the subject matter of any of Examples 18-20, and wherein opening the secure connection comprises opening a secure connection using a wireless network adapter of the mobile computing device.

Example 22 includes the subject matter of any of Examples 18-21, and wherein determining the remote boot address comprises receiving the remote boot address from a dynamic host configuration protocol server.

Example 23 includes the subject matter of any of Examples 18-22, and wherein determining the remote boot address comprises receiving the remote boot address from a manageability engine of the mobile computing device.

Example 24 includes the subject matter of any of Examples 18-23, and further including storing the remote boot address in a secure memory space of the manageability engine.

Example 25 includes the subject matter of any of Examples 18-24, and wherein determining the remote boot address comprises receiving the remote boot address from a console of the mobile computing device.

Example 26 includes the subject matter of any of Examples 18-25, and wherein determining the remote boot address comprises determining the remote boot address based on a context of the mobile computing device.

Example 27 includes the subject matter of any of Examples 18-26, and wherein determining the remote boot address based on a context of the mobile computing device comprises determining the remote boot address based on a location of the mobile computing device determined using a location sensor of the mobile computing device.

Example 28 includes the subject matter of any of Examples 18-27, and wherein opening the secure connection comprises sending a certificate of the mobile computing device to the web server; and opening the secure connection in response to the certificate being validated by the web server.

Example 29 includes the subject matter of any of Examples 18-28, and further including authenticating a user of the mobile computing device on the mobile computing device, wherein sending the certificate comprises sending a certificate associated with the user to the web server in response to authenticating the user.

Example 30 includes the subject matter of any of Examples 18-29, and wherein mapping the boot resource to the local firmware protocol comprises mapping a file system image to a local block input/output firmware protocol.

Example 31 includes the subject matter of any of Examples 18-30, and wherein mapping the file system image comprises mapping one of a compact disc file system image and a universal disk format file system image.

Example 32 includes the subject matter of any of Examples 18-31, and wherein mapping the boot resource to the local firmware protocol comprises mapping the boot resource to a local file system protocol of the mobile computing device.

Example 33 includes the subject matter of any of Examples 18-32, and wherein executing the boot resource comprises calling an operating system loader of the mobile computing device, wherein the operating system loader terminates boot services of the mobile computing device.

Example 34 includes the subject matter of any of Examples 18-33, and wherein executing the boot resource comprises verifying a digital signature of the boot resource; and executing the boot resource in response to successfully verifying the digital signature.

Example 35 includes a computing device comprising a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a mobile computing device to securely boot from a web server, the mobile computing device comprising means for determining, on the mobile computing device, a remote boot address that identifies a location of a boot resource of a web server; means for opening a secure connection from the mobile computing device to the web server; means for mapping, on the mobile computing device, the boot resource of the web server to a local firmware protocol; and means for executing, on the mobile computing device, the boot resource as a firmware image using the local firmware protocol.

Example 38 includes the subject matter of Example 37, and further including means for downloading the boot resource of the web server from the web server to the mobile computing device in response to mapping the boot resource to the local firmware protocol.

Example 39 includes the subject matter of any of Examples 37 and 38, and further including means for downloading a portion, less than the entirety, of the boot resource of the web server from the web server to the mobile computing device in response to mapping the boot resource to the local firmware protocol.

Example 40 includes the subject matter of any of Examples 37-39, and wherein the means for opening the secure connection comprises means for opening a secure connection using a wireless network adapter of the mobile computing device.

Example 41 includes the subject matter of any of Examples 37-40, and wherein the means for determining the remote boot address comprises means for receiving the remote boot address from a dynamic host configuration protocol server.

Example 42 includes the subject matter of any of Examples 37-41, and wherein the means for determining the remote boot address comprises means for receiving the remote boot address from a manageability engine of the mobile computing device.

Example 43 includes the subject matter of any of Examples 37-42, and further including means for storing the remote boot address in a secure memory space of the manageability engine.

Example 44 includes the subject matter of any of Examples 37-43, and wherein the means for determining the remote boot address comprises means for receiving the remote boot address from a console of the mobile computing device.

Example 45 includes the subject matter of any of Examples 37-44, and wherein the means for determining the remote boot address comprises means for determining the remote boot address based on a context of the mobile computing device.

Example 46 includes the subject matter of any of Examples 37-45, and wherein the means for determining the remote boot address based on a context of the mobile computing device comprises means for determining the remote boot address based on a location of the mobile computing device determined using a location sensor of the mobile computing device.

Example 47 includes the subject matter of any of Examples 37-46, and wherein the means for opening the secure connection comprises means for sending a certificate of the mobile computing device to the web server; and means for opening the secure connection in response to the certificate being validated by the web server.

Example 48 includes the subject matter of any of Examples 37-47, and further including means for authenticating a user of the mobile computing device on the mobile computing device, wherein the means for sending the certificate comprises means for sending a certificate associated with the user to the web server in response to authenticating the user.

Example 49 includes the subject matter of any of Examples 37-48, and wherein the means for mapping the boot resource to the local firmware protocol comprises means for mapping a file system image to a local block input/output firmware protocol.

Example 50 includes the subject matter of any of Examples 37-49, and wherein the means for mapping the file system image comprises means for mapping one of a compact disc file system image and a universal disk format file system image.

Example 51 includes the subject matter of any of Examples 37-50, and wherein the means for mapping the boot resource to the local firmware protocol comprises means for mapping the boot resource to a local file system protocol of the mobile computing device.

Example 52 includes the subject matter of any of Examples 37-51, and wherein the means for executing the boot resource comprises means for calling an operating system loader of the mobile computing device, wherein the operating system loader terminates boot services of the mobile computing device.

Example 53 includes the subject matter of any of Examples 37-52, and wherein the means for executing the boot resource comprises means for verifying a digital signature of the boot resource; and means for executing the boot resource in response to successfully verifying the digital signature.

The invention claimed is:

1. A mobile computing device to securely boot from a web server, the mobile computing device comprising:
    a hardware processor;
    a volatile memory; and
    one or more non-transitory, machine readable storage media comprising a plurality of instructions that, when executed by the hardware processor of the mobile computing device, cause the mobile computing device to:
        determine a remote boot address that identifies a location of a boot resource of the web server, wherein the remote boot address identifies the web server and a remote resource of the web server that contains the boot resource;
        open a secure connection from the mobile computing device to the web server;
        map the boot resource of the web server to a local block input/output firmware protocol, wherein the local block input/output firmware protocol defines one or more function call interfaces callable from firmware images of the mobile computing device, wherein each function call interface comprises a function pointer that identifies a firmware function stored in the volatile memory of the mobile computing device; and
        execute the boot resource as a firmware image with the local block input/output firmware protocol by invocation of the one or more function call interfaces of the local block input/output firmware protocol, wherein to execute the boot resource comprises to:
            (i) invoke a local file system firmware protocol to load the firmware image into the volatile memory, (ii) invoke the one or more function call interfaces of the local block input/output firmware protocol to access an array of blocks in response to invocation of the local file system firmware protocol, and (iii) execute the firmware image in the volatile memory in response to loading of the firmware image into the volatile memory and in response to invocation of the one or more function call interfaces of the local block input/output firmware protocol;
        wherein to map the boot resource of the web server to the local block input/output firmware protocol comprises to (i) map the access to the array of blocks via the local block input/output firmware protocol to a web request to the remote boot address, and (ii) send the web request to the web server via the secure connection in response to the invocation of the one or more function call interfaces of the local block input/output firmware protocol.

2. The mobile computing device of claim 1, further comprising:
    a manageability engine, wherein the manageability engine comprises an out-of-band processor distinct from the hardware processor and a secure memory space;
    wherein the one or more non-transitory, machine readable storage media further comprises a plurality of instructions that, when executed by the hardware processor, cause the mobile computing device to receive the remote boot address from the manageability engine, wherein the remote boot address is stored in the secure memory space of the manageability engine.

3. The mobile computing device of claim 1, wherein the one or more non-transitory, machine readable storage media further comprises a plurality of instructions that, when executed by the hardware processor, cause the mobile computing device to determine the remote boot address based on a location of the mobile computing device determined using a location sensor.

4. The mobile computing device of claim 1, wherein the one or more non-transitory, machine readable storage media further comprises a plurality of instructions that, when executed by the hardware processor, cause the mobile computing device to:
    authenticate a user of the mobile computing device on the mobile computing device;
    send a certificate associated with the user to the web server in response to the user being authenticated; and
    open the secure connection in response to the certificate being validated by the web server.

5. The mobile computing device of claim 1, wherein the boot resource of the web server comprises a file system image and the local block input/output firmware protocol represents the boot resource of the web server as an array of blocks.

6. The mobile computing device of claim 5, wherein the one or more non-transitory, machine readable storage media further comprises a plurality of instructions that, when executed by the hardware processor, cause the mobile computing device to map one of a compact disc file system image or a universal disk format file system image.

7. A method for secure web boot on a mobile computing device, the method comprising:
    determining, on the mobile computing device, a remote boot address that identifies a location of a boot resource of a web server, wherein the remote boot address identifies the web server and a remote resource of the web server that contains the boot resource;

opening a secure connection from the mobile computing device to the web server;

mapping, on the mobile computing device, the boot resource of the web server to a local block input/output firmware protocol, wherein the local block input/output firmware protocol defines one or more function call interfaces callable from firmware images of the mobile computing device, wherein each function call interface comprises a function pointer that identifies a firmware function stored in a memory of the mobile computing device; and executing, on the mobile computing device, the boot resource as a firmware image using the local block input/output firmware protocol by invoking the one or more function call interfaces of the local block input/output firmware protocol;

wherein executing the boot resource comprises (i) invoking a local file system firmware protocol to load the firmware image into the volatile memory, (ii) invoking the one or more function call interfaces of the local block input/output firmware protocol to access an array of blocks in response to invoking the local file system firmware protocol, and (iii) executing the firmware image in the volatile memory in response to loading the firmware image into the volatile memory and in response to invoking the one or more function call interfaces of the local block input/output firmware protocol; and wherein mapping the boot resource to the local block input/output firmware protocol comprises (i) mapping the access to the array of blocks via the local block input/output firmware protocol to a web request to the remote boot address, and (ii) sending the web request to the web server via the secure connection in response to invoking the one or more function call interfaces of the local block input/output firmware protocol.

8. The method of claim 7, wherein determining the remote boot address comprises determining the remote boot address based on a context of the mobile computing device.

9. The method of claim 7, further comprising:
authenticating a user of the mobile computing device on the mobile computing device,
sending a certificate associated with the user to the web server in response to authenticating the user; and
opening the secure connection in response to the certificate being validated by the web server.

10. The method of claim 7, wherein the boot resource comprises a file system image and the local block input/output firmware protocol represents the boot resource of the web server as an array of blocks.

11. The method of claim 10, wherein mapping the file system image comprises mapping one of a compact disc file system image and a universal disk format file system image.

12. One or more non-transitory, machine readable storage media comprising a plurality of instructions that in response to being executed result in a mobile computing device:
determining a remote boot address that identifies a location of a boot resource of a web server, wherein the remote boot address identifies the web server and a remote resource of the web server that contains the boot resource;
opening a secure connection from the mobile computing device to the web server;
mapping the boot resource of the web server to a local block input/output firmware protocol, wherein the local block input/output firmware protocol defines one or more function call interfaces callable from firmware images of the mobile computing device, wherein each function call interface comprises a function pointer that identifies a firmware function stored in a memory of the mobile computing device; and
executing the boot resource as a firmware image using the local block input/output firmware protocol by invoking the one or more function call interfaces of the local block input/output firmware protocol;
wherein executing the boot resource comprises (i) invoking a local file system firmware protocol to load the firmware image into the volatile memory, (ii) invoking the one or more function call interfaces of the local block input/output firmware protocol to access an array of blocks in response to invoking the local file system firmware protocol, and (iii) executing the firmware image in the volatile memory in response to loading the firmware image into the volatile memory and in response to invoking the one or more function call interfaces of the local block input/output firmware protocol; and
wherein mapping the boot resource to the local block input/output firmware protocol comprises (i) mapping the access to the array of blocks via the local block input/output firmware protocol to a web request to the remote boot address, and (ii) sending the web request to the web server via the secure connection in response to invoking the one or more function call interfaces of the local block input/output firmware protocol.

13. The non-transitory, machine readable storage media of claim 12, further comprising a plurality of instructions that in response to being executed result in the mobile computing device downloading a portion, less than an entirety, of the boot resource of the web server from the web server to the mobile computing device in response to mapping the boot resource to the local block input/output firmware protocol.

14. The non-transitory, machine readable storage media of claim 12, further comprising a plurality of instructions that in response to being executed result in the mobile computing device:
receiving the remote boot address from a manageability engine of the mobile computing device, wherein the manageability engine comprises an out-of-band processor and a secure memory space; and
storing the remote boot address in the secure memory space of the manageability engine.

15. The non-transitory, machine readable storage media of claim 12, wherein determining the remote boot address comprises determining the remote boot address based on a location of the mobile computing device determined using a location sensor of the mobile computing device.

16. The non-transitory, machine readable storage media of claim 12, wherein the boot resource comprises a file system image and the local block input/output firmware protocol represents the boot resource of the web server as an array of blocks.

17. The non-transitory, machine readable storage media of claim 12, wherein executing the boot resource comprises:
verifying a digital signature of the boot resource; and
executing the boot resource in response to successfully verifying the digital signature.

* * * * *